(12) United States Patent
Angel

(10) Patent No.: US 8,641,075 B1
(45) Date of Patent: Feb. 4, 2014

(54) ANTI-SWAY TRAILER HITCH AND METHOD

(71) Applicant: Bruce A. Angel, Stokesdale, NC (US)

(72) Inventor: Bruce A. Angel, Stokesdale, NC (US)

(73) Assignee: Comco Manufacturing, Inc., Greensboro, NC (US)

( * ) Notice: Subject to any disclaimer, the term of this patent is extended or adjusted under 35 U.S.C. 154(b) by 0 days.

(21) Appl. No.: 13/714,798

(22) Filed: Dec. 14, 2012

(51) Int. Cl.
*B60D 1/30* (2006.01)
(52) U.S. Cl.
USPC ............. 280/455.1; 280/494; 280/405.1; 280/484; 280/485; 280/489
(58) Field of Classification Search
USPC ............ 280/455.1, 494, 405.1, 484, 485, 489
See application file for complete search history.

(56) References Cited

U.S. PATENT DOCUMENTS

| | | | |
|---|---|---|---|
| 3,471,170 A | 10/1969 | Rendessy | 280/446 |
| 3,787,077 A * | 1/1974 | Sanders | 280/455.1 |
| 3,801,133 A | 4/1974 | Thompson | 280/406 |
| 3,825,282 A * | 7/1974 | Meinholdt | 280/455.1 |
| 3,957,286 A | 5/1976 | Goodwin | 280/446 |
| 4,165,885 A | 8/1979 | Good et al. | 280/446 |
| 4,306,734 A | 12/1981 | Swanson et al. | 280/446 |
| 4,549,746 A | 10/1985 | Hager | 280/446 |
| 4,978,133 A * | 12/1990 | Thorne et al. | 280/484 |
| 5,509,682 A * | 4/1996 | Lindenman et al. | 280/440 |
| 5,660,409 A | 8/1997 | Hensley | 280/455.1 |
| 5,707,071 A | 1/1998 | Prestidge et al. | 280/455.1 |
| 5,984,341 A | 11/1999 | Kass et al. | 280/455.1 |
| 6,142,500 A * | 11/2000 | Sargent | 280/405.1 |
| 6,419,257 B1 | 7/2002 | McCoy et al. | 280/455.1 |
| 6,629,701 B1 | 10/2003 | Colibert | 280/455.1 |
| 7,025,370 B2 | 4/2006 | Anderson et al. | 280/405.1 |
| 7,303,205 B2 | 12/2007 | Richardson et al. | 280/455.1 |
| 7,506,885 B2 | 3/2009 | Colibert | 280/405.1 |
| 7,934,742 B2 | 5/2011 | Anderson et al. | 280/406.1 |
| 7,967,320 B2 | 6/2011 | Anderson et al. | 280/455.1 |
| 8,025,307 B2 | 9/2011 | Moore et al. | 280/455.1 |
| 8,119,892 B2 * | 2/2012 | Leach et al. | 84/293 |
| 2009/0152832 A1 * | 6/2009 | Moore et al. | 280/455.1 |
| 2011/0156372 A1 | 6/2011 | Harper et al. | 280/515 |

OTHER PUBLICATIONS

Nine (9) scanned pages including the cover page, p. 764, pp. 766-770, p. 772 and the back cover from Stag The Big Book 2012 catalog showing various weight distributing hitches.

* cited by examiner

*Primary Examiner* — Joseph M Rocca
*Assistant Examiner* — Marlon Arce
(74) *Attorney, Agent, or Firm* — Blake P. Hart

(57) ABSTRACT

An anti-sway hitch having a ball mount housing which defines a channel and a trunnion pivotally positioned within the channel. The hitch also has a spring, a first engagement member, and a second engagement member with the spring mounted on the first member within the ball mount housing and the first member engaging the second member. The hitch further includes a post positioned within the ball mount housing and the engagement members positioned on the post wherein rotation of the trunnion causes corresponding rotation of the post and the first member. A method of towing a trailer with an anti-sway hitch is also provided.

18 Claims, 6 Drawing Sheets

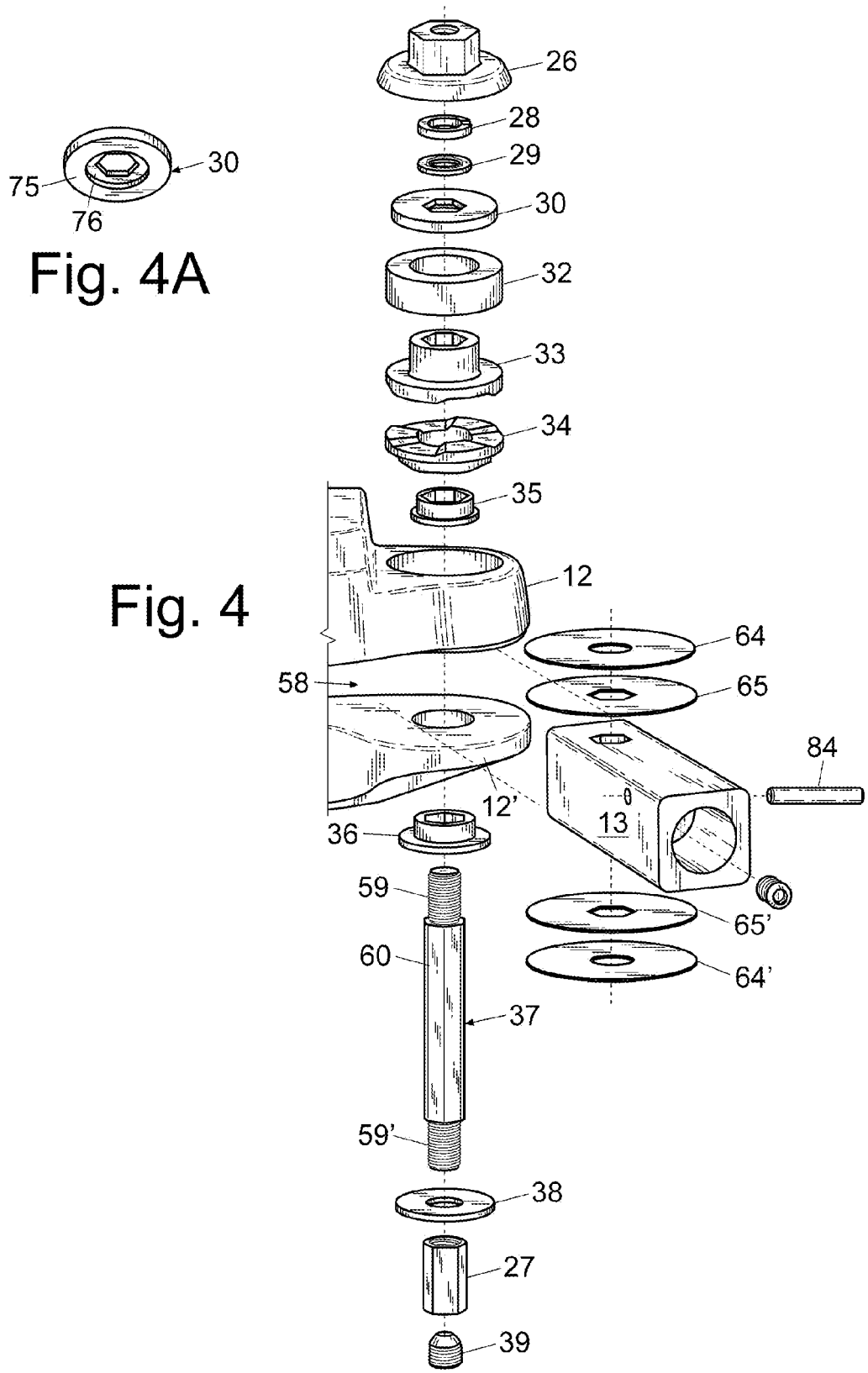

ANTI-SWAY TRAILER HITCH AND METHOD

FIELD OF THE INVENTION

The invention herein pertains to weight distributing trailer hitches generally and particularly pertains to an anti-sway trailer hitch with an opposing pair of engagement members to control trailer sway and an improved loading retainer.

DESCRIPTION OF THE PRIOR ART AND OBJECTIVES OF THE INVENTION

Typically, a trailer is connected to a tow vehicle with a ball and socket coupling located at the rear of the tow vehicle. For example, the tow vehicle is fitted with a hitch ball positioned at the end of the shank mounted on the tow vehicle which projects either upwardly or outwardly from the tow vehicle bumper, while the trailer has a socket coupler on a forward projecting tongue. The socket is designed to fit over and close around the ball hitch to secure the trailer to the tow vehicle. This arrangement allows the tow vehicle to turn relative to the trailer, but it also allows the trailer to sway laterally (i.e. left or right) relative to the tow vehicle. This problem has the potential to be very dangerous as it may cause the driver of the tow vehicle to lose control of the trailer and the vehicle during operation. External influences such as wind, uneven road sources, and other vehicles can all exacerbate this already serious situation.

Historically, attempts to correct this swaying (sometimes referred to as "fishtailing") focused on stiffening the pivot joints between the trailer and the tow vehicle. Also known as "locking" the trailer to the tow vehicle, such a strategy avoids the fishtailing issue but creates new challenges as well. One problem is that when a heavily loaded trailer and tow vehicle are locked together, the linear force exerted by the trailer entering a turn can overcome the tow vehicle when turning. This may lead to the trailer literally driving the tow vehicle off the road. Turns may also impose substantial stress on non-pivotable hitch components that over time can lead to structural failure in various hitch parts. Further, locking a trailer to a tow vehicle by its very nature makes the two vehicles very difficult to turn and maneuver, especially in tight settings like campgrounds and boat docks.

Another conventional solution to the sway problem is known as a weight distributing hitch that seeks to balance the tow vehicle weight and trailer weight by spreading the total weight more evenly between the front and rear axles of the tow vehicle and any axles of the trailer. Weight distribution hitches often accomplish this by using spring bars that are engaged on one end with the hitch head and chains or other, more rigid attachments that are affixed to the trailer on the other end. As the trailer's weight pushes down on the bars, they are pulled up by the chains.

Thus, in view of the problems and disadvantages associated with prior art trailer hitches, the present invention was conceived and one of its objectives is to provide an anti-sway trailer hitch that uses spring bars to prevent lateral sway of a towed trailer.

It is another objective of the present invention to provide an anti-sway trailer hitch that can engage or disengage the anti-sway function as a user desires.

It is still another objective of the present invention to provide a hitch that controls the pivoting of a spring bar with the engagement of a pair of corresponding engagement members.

It is yet another objective of the present invention to provide a ball mount assembly that includes two plates each defining a plateau which engage one another in a frictional manner.

It is a further objective of the present invention to provide a hitch assembly with a cap that can be tightened with a wrench to permit a user to incrementally control the permitted degree of sway in a trailer.

It is still a further objective of the present invention to provide an anti-sway trailer hitch that uses a pair of plates which have plateaus of different slopes to control the range of motion allowed by a trunnion which is inserted into a channel in the ball mount housing.

It is yet a further objective of the present invention to provide a trailer hitch with an improved spring bar retainer.

It is a further objective of the present invention to provide a spring bar retainer with a nylon pad for improved bar retention while also creating less noise.

It is still a further objective of the present invention to provide a method of towing a trailer with an anti-sway hitch that incrementally controls the trailer sway by employing the engagement of a pair of plates.

It is yet another objective of the present invention to provide a method of towing a load that controls trailer sway with conventional spring bars connected to a hitch instead of chains as conventional.

Various other objectives and advantages of the present invention will become apparent to those skilled in the art as a more detailed description is set forth below.

SUMMARY OF THE INVENTION

The aforesaid and other objectives are realized by providing a weight distributing anti-sway trailer hitch including a ball mount housing with a channel and a trunnion, the trunnion pivotally positioned within the channel. The hitch also has a spring, a first engagement member, and a second engagement member, the spring mounted on the first member which in turn engages the second member within the ball mount housing. The hitch also includes a post positioned inside the ball mount housing with the engagement members positioned on the post. Trailer sway causes rotation of the trunnion which in turn causes corresponding rotation of the post and the first member while the second member remains fixed.

A method of towing a trailer with a weight distributing anti-sway hitch is also provided. The method includes the steps of providing a tow vehicle with a towing hitch, towing receptacle and a trailer. The method also includes the step of providing a hitch with an adjustable cap, a first engagement member, and a second engagement member engaging the first member. The method further includes the step of providing a post positioned within the hitch with the members mounted thereon and the cap attached to the post. The method still further includes the steps of connecting the hitch to the tow vehicle, fastening the trailer to the hitch, and towing the trailer with a tow vehicle.

BRIEF DESCRIPTION OF THE DRAWINGS

FIG. 4 demonstrates an exploded side perspective view of the components within one side of the anti-sway trailer hitch of FIG. 1;

FIG. 4A shows a side perspective view of the opposite side of the compression plate of FIG. 4;

DETAILED DESCRIPTION OF THE PREFERRED EMBODIMENT AND OPERATION OF THE INVENTION

Figure 1:
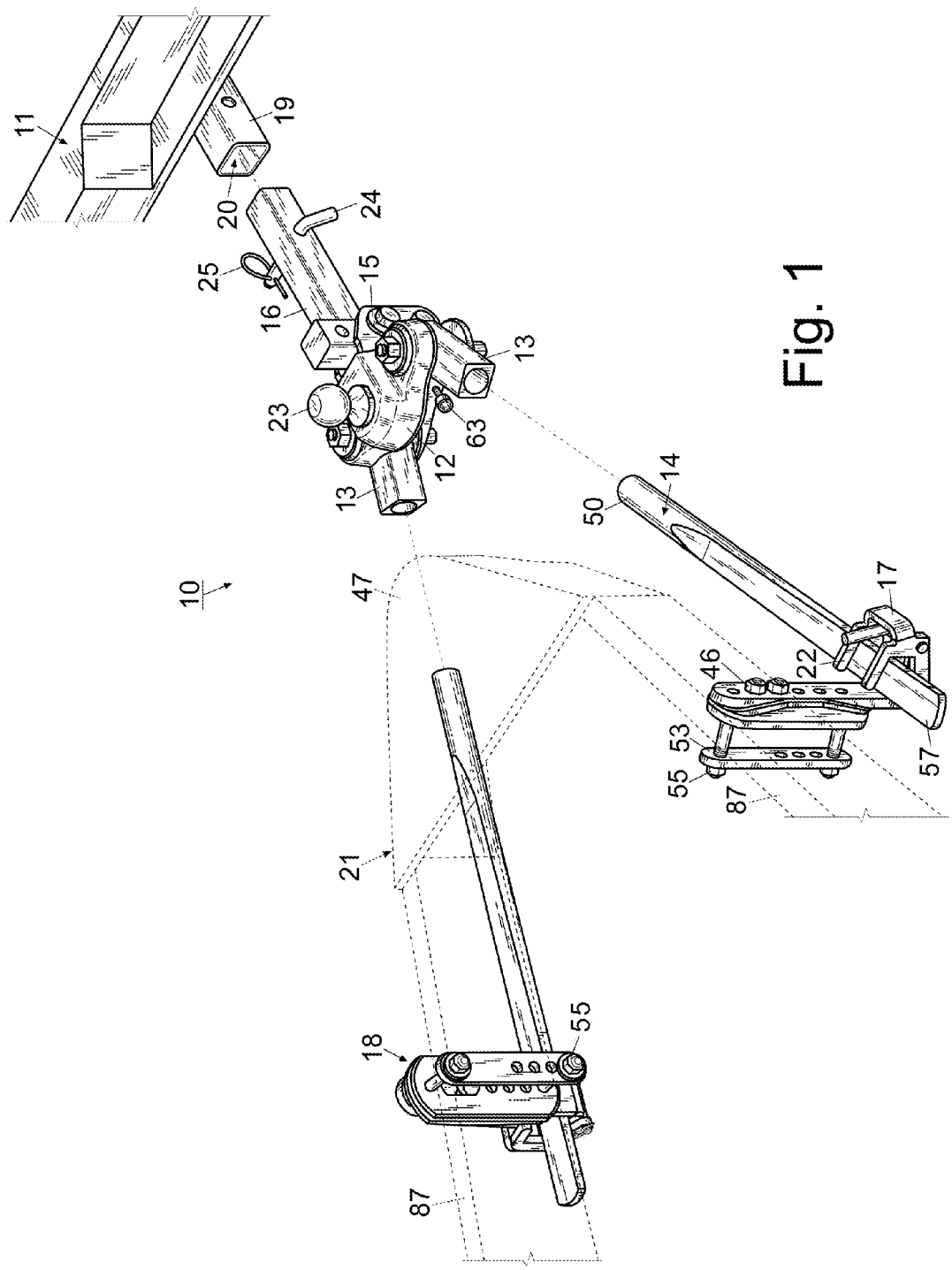
FIG. 1 shows an elevated side perspective view of a weight distributing anti-sway trailer hitch prior to engagement with a trailer and a tow vehicle.

For a better understanding of the invention and its operation, turning now to the drawings, FIG. 1 shows an elevated side perspective view of a schematic representation of anti-sway trailer hitch 10 prior to engagement with trailer 21 and tow vehicle 11 as known in the art. Hitch 10 is affixed to tow vehicle 11 by placing shank 16 into receptacle 20 of tow hitch 19 and securing shank 16 therein with hitch pin 24 and cotter pin 25 (FIG. 2) as is conventional. Thereafter, trailer 21 is raised above hitch ball 23 whereby trailer tongue 47 is lowered until hitch ball 23 is engaged and trailer tongue 47 is locked into place as is conventional. Spring bars 14 are then inserted into trunnions 13 of hitch 10 and thereafter secured to trailer 11 by attachment of retainers 17 (FIG. 6) and couplings 18 described in more detail below. Once connected and secure tow vehicle 11 may then commence towing trailer 21.

Figure 2:
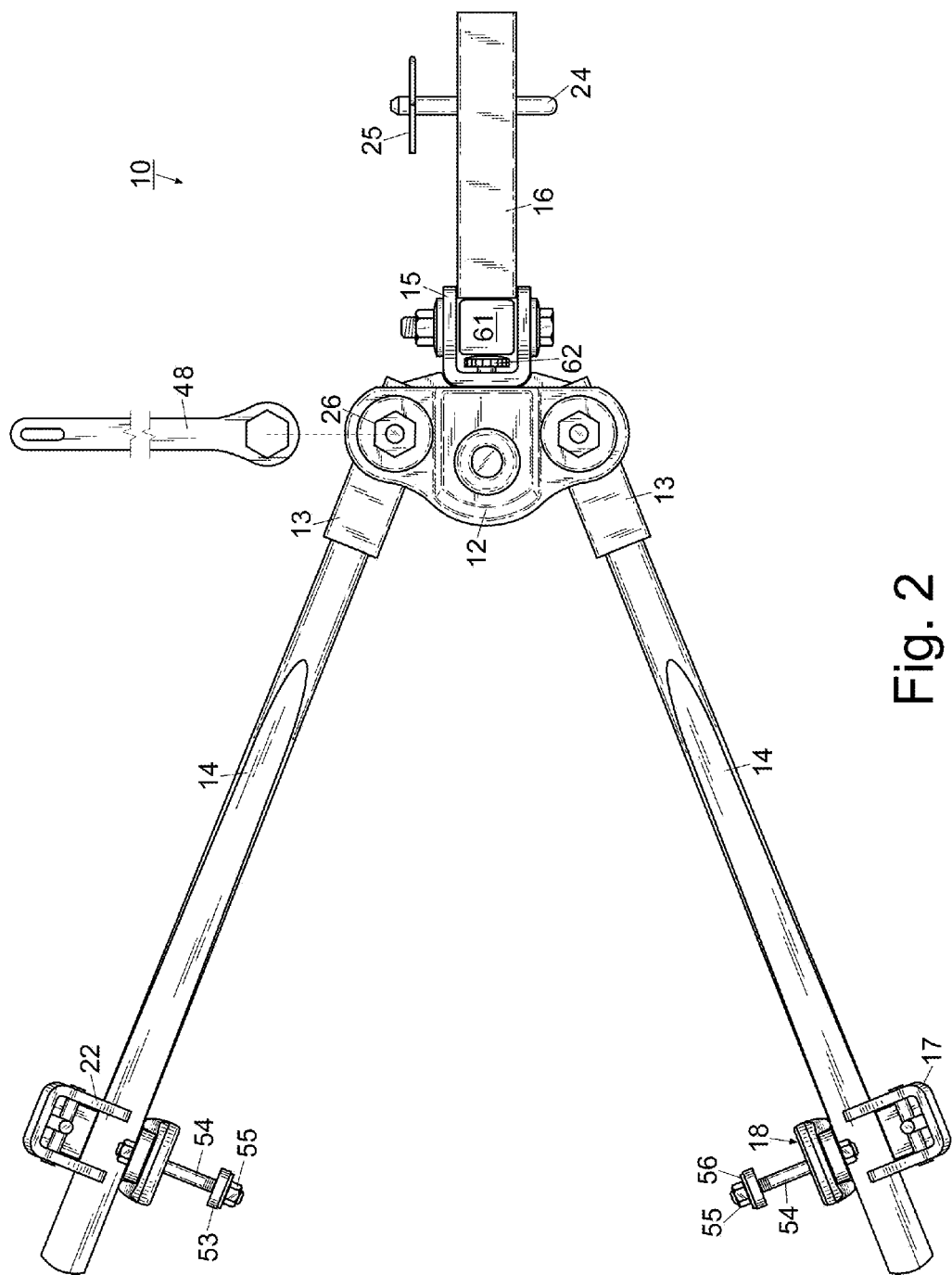
FIG. 2 pictures a top plan view of the anti-sway trailer hitch of FIG. 1 with spring bars secured.
Figure 3:
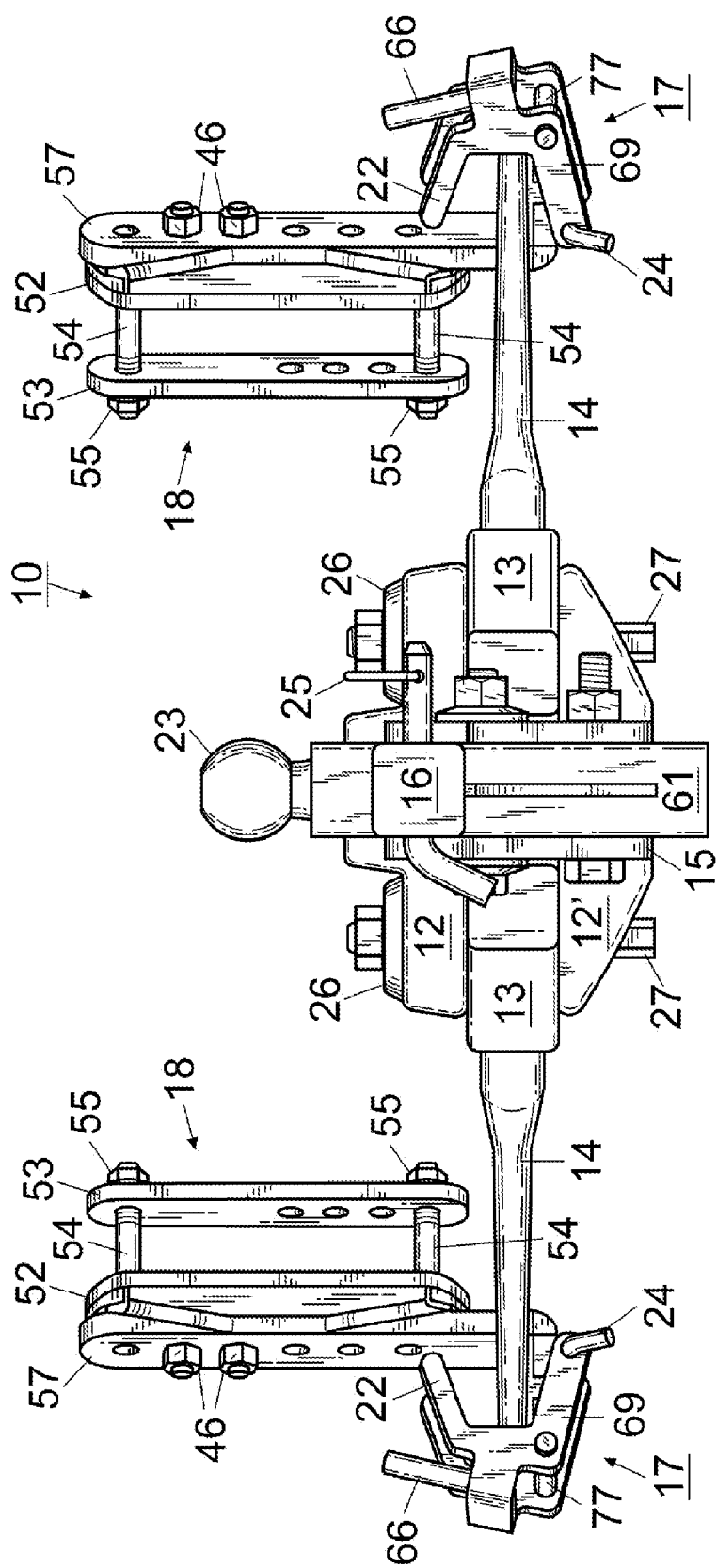
FIG. 3 depicts an elevated front view of the anti-sway trailer hitch of FIG. 2.

Preferred weight distributing anti-sway hitch 10 includes forged two-piece ball mount housings 12, 12' formed from steel capable of withstanding the great forces placed on the pivoting points of hitch 10. Base hex screw 63 aids in maintaining a stable hitch assembly by engaging threaded adjustment knob 62 (FIG. 2) to maintain hitch 10 in the desired towing position relative to adjustment bar 61 (FIG. 2) and shank 16. Ball mount housings 12, 12' define U-shaped channel 58 (FIG. 4) therebetween that holds opposing tubular trunnions 13 therein as also seen in FIGS. 2 and 3. Preferred spring bar 14 is a conventional "fixed pin end" spring bar as known in the art to control lateral movement of towed loads and includes cylindrical end 50 which is inserted into corresponding trunnion 13 of hitch (FIG. 2), rotated into the proper orientation, and held in place with dowel 84 (FIG. 4) while opposing flat end 51 is joined to retainer 17 which is affixed to coupling 18. Spring bar 14 is shown in FIGS. 1-6 as having a generally circular cross-section but may have various cross-sectional shapes in one or more alternate embodiments (not shown). In an alternate embodiment, spring bar 14 is a conventional spring bar secured to trunnion 13 with an insertable pin (not shown).

Preferred coupling 18 as seen in FIG. 3 includes hookup plate 52 and adjustment plate 53 joined together by an opposing pair of threaded posts 54 with conventional attachment washers 56 and attachment nuts 55 also seen in FIGS. 1 and 2. Hookup plate 52 is secured to hanger plate 57 of retainer 17 by coupling fasteners 46, which are represented in FIG. 1 as threaded bolts but may be any suitable fastener.

As seen in FIG. 1, coupling 18 engages side rail 87 of trailer 21 which is maintained between hookup plate 52 and adjustment plate 53. Attachment nuts 55 with washers 56 are tightened against adjustment plate 53 to tightly engage and maintain side rail 87 therebetween to prevent unwanted movement. As would be understood while only one side of hitch 10 and the components affixed thereto may be described, the descriptions herein equally apply to the components on the opposite side.

Figure 6:
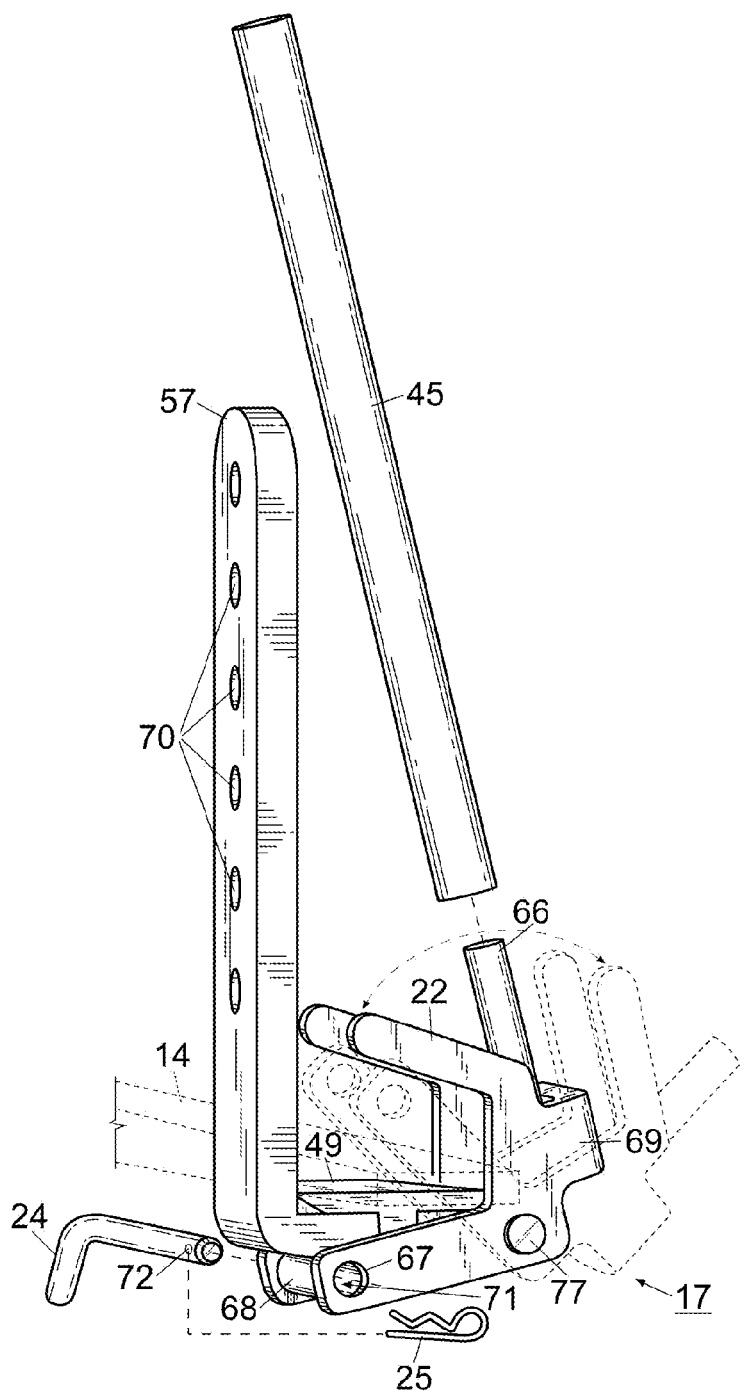
FIG. 6 features an elevated side perspective view of a spring bar retainer in a closed position with the open position shown in dotted line fashion.

A top plan view of anti-sway hitch 10 is shown in FIG. 2 while an elevated front view is depicted in FIG. 3. For proper operation of anti-sway hitch 10, spring bars 14 should be positioned within trunnions 13 as previously described. Spring bars 14 should also be secured by retainers 17. As illustrated in FIG. 6, preferable retainer 17 includes L-shaped steel hanger plate 57, steel clamp 69, C-shaped retainer finger 22 and mounting cylinder 66. L-shaped hanger plate 57 includes a series of apertures 70 therein for adjusting the attachment of hookup plate 52 as needed depending on the required height for the vehicle and trailer in tow. Retainer 17 further includes cylindrical hollow hanger chamber 68 that is preferably welded to hanger plate 57 and defines pin channel 71. Clamp 69 includes opposing retainer holes 67 which align with hanger chamber 68 for receiving hitch pin 24 therethrough whereby cotter pin 25 is inserted to prevent unwanted removal of hitch pin 24.

Clamp 69 with C-shaped retainer finger 22 pivots downwardly about pivot pin 77 to an open position that allows a user (not shown) to place spring bar 14 atop friction pad 49 which is affixed to hanger plate 57 and positioned proximal clamp 69 beneath retainer finger 22. Thereafter pipe 45 is positioned over mounting cylinder 66 and clamp 69 is rotated away from hanger plate 57 as illustrated by the dotted lines in FIG. 6 until retainer holes 67 are aligned with pin channel 71 of hanger chamber 68. Once aligned, hitch pin 24 passes through retainer holes 67 and channel 71 to secure clamp 69 thereto. Hitch pin 24 also defines aperture 72 that is sized to receive cotter pin 25, which is inserted into aperture 72 when trailer 21 is prepared for travel to prevent unwanted removal of hitch pin 24. Pipe 45 is then removed and stored as conventional in the cab or bed of towing vehicle 11 until needed.

Although friction pad 49 may be formed from any suitable material, preferred friction pad 49 is a rectangular snap-in nylon pad which reduces the wear spring bar 14 exerts on retainer 17 while also reducing any noise otherwise produced from spring bar 14 rubbing on retainer 17.

FIG. 4 demonstrates an exploded perspective view of the components within anti-sway hitch 10 that are consecutively mounted on post 37 and maintained in ball mounting housings 12, 12'. The first part is cap 26 which preferably includes a hexagonal top for engagement by wrench 48 (FIG. 2) during tightening or loosening. By manipulation of cap 26, a user (not shown) can compress or relax the following components positioned therebeneath: conventional lock washer 28, washer 29, compression plate 30, spring 32, and rotatable first engagement member 33. Lock washer 28 and washer 29 each have a circular central aperture with washer 29 frictionally contacting lock washer 28 while compression plate 30 preferably defines a hexagonal central aperture. FIG. 4A shows opposite side 75 (i.e. the surface facing away from washer 29) of compression plate 30 that includes central circular bore-out 76. When compressed, spring 32 impacts side 75 of compression plate 30 and exerts downward pressure on first engagement member 33. When this pressure overcomes the resilient bias of spring 32, the upper portion of first engagement member 33 vertically clears spring 32 and is received within bore-out 76.

Spring 32 is preferably formed from polyurethane and has a cylindrical design that defines a central circular aperture sized to vertically mount and fit over rotatable engagement member 33 when compressed. In one or more alternative embodiments, spring 32 may be formed from any material sufficiently resilient to exert downward pressure on engagement member 33 when cap 26 is tightened. Preferably, engagement member 33 is formed having an elongated cylindrical upper portion affixed to a larger diameter circular base portion and includes a central hexagonal aperture formed therein. On the underside of the base portion, first engagement member 33 defines preferably three (3) plateaus 40 and three (3) valleys 80. Plateaus 40 each include opposing sides 41 and 42 defining respectively sloped faces 43, 44. Preferably, sloped face 43 is approximately forty-five degrees (45°) while sloped face 44 is approximately thirty-two degrees (32°). As would be understood, rotatable engagement member 33 could be formed with a variety of plateaus having sides with slopes varying from one to ninety degrees (1-90°).

Figure 5A:
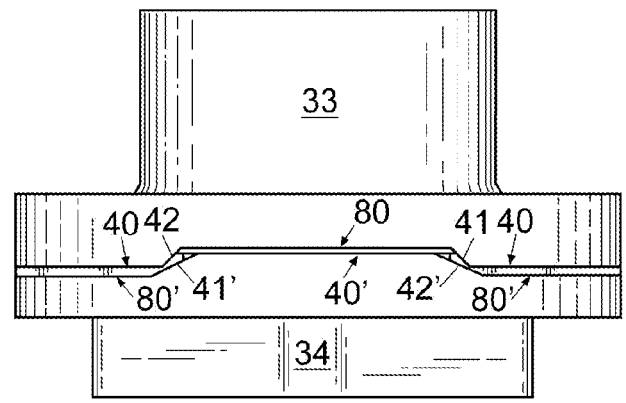
FIG. 5A illustrates a side elevational view of the plates of FIG. 4 engaged.
Figure 5B:
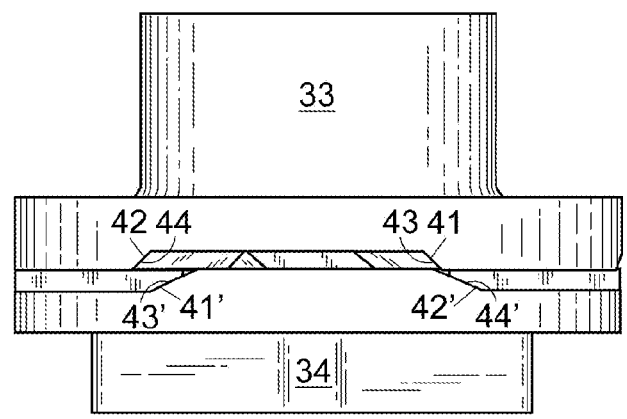
FIG. 5B features a side elevational view of the plates of FIG. 5A rotated five degrees (5°)
Figure 5C:
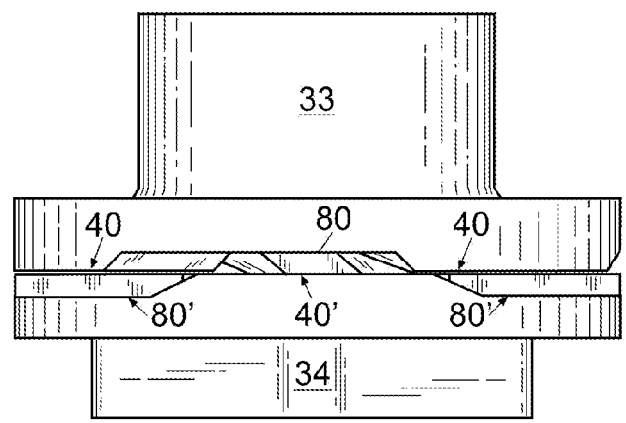
FIG. 5C shows a side elevational view of the plates of FIG. 5B rotated ten degrees (10°)

Beneath rotatable engagement member 33 in opposing relation is fixed second engagement member 34 which has a shorter hexagonal lower portion affixed to a larger diameter cylindrical upper base portion and includes a central circular aperture formed therein. The larger upper base portion is identical to the larger diameter portion of first engagement member 33 and is opposingly positioned as seen in FIGS. 5A, 5B and 5C. Fixed engagement member 34 likewise defines and three (3) valleys 80' and three (3) plateaus 40', each with respective sides 41' and 42', which respectively define sloped faces 43', 44'. Preferably, sloped face 43' is approximately forty-five degrees) (45°) while sloped face 44' is approximately thirty-two degrees (32°). As would be understood, second engagement member 34 could be formed with a variety of plateaus having sides with slopes varying from one to ninety degrees (1-90°). Both rotatable engagement member 33 and fixed engagement member 34 are preferably formed from hardened steel, although other metallic and polymeric materials would also be acceptable.

Beneath second engagement member 34 is upper bushing 35. Preferably, upper bushing 35 has an upper cylindrical section defining a hexagonal central opening connected to a base cylindrical section having a greater diameter than the upper cylindrical section. Upper bushing 35 is positioned within ball mount housing 12 and is sized for insertion into the central circular aperture of second engagement member 34. Ball mount housing 12 also defines a lower hexagonal base opening (not shown) within which to secure the hexagonal lower portion of fixed engagement member 34.

Beneath ball mount housing 12 and within channel 58 are outer wear plate 64 and inner wear plate 65. Preferably formed from a harder metal (compared to ball mount housing 12, 12') such as 1095 spring steel, wear plates 64 and 65 function to reduce the metal wear from ball mount housing 12 and trunnion 13. Outer wear plate 64 is a conventional disk located distal trunnion 13 and defines a circular central opening while inner wear plate 65 is located more proximal trunnion 13 and includes a hexagonal central aperture.

Preferred tubular trunnion 13 is formed from steel and includes a central horizontal opening sized to sufficiently receive spring bar end 50 therein. On the opposing end trunnion includes a vertical hexagonal aperture (not shown) for receipt of post 37 therethrough.

Located beneath trunnion 13 but above ball mount housing 12' is preferably another inner wear plate 65' and outer wear plate 64', respectively, also intended to reduce metal-on-metal wearing between trunnion 13 and ball mount housing 12'. As would be understood each of ball mount housings 12, 12' include openings therein for reception and containment of the various components described herein.

Positioned beneath ball mount housing 12' is lower bushing 36. Although the same general shape as upper bushing 35, lower bushing 36 preferably has a thicker outer diameter both at the base section and at the cylindrical section, leading it to be a slightly larger component overall than upper bushing 35. Similar to upper bushing 35, lower bushing 36 is positioned within an opening (not shown) of ball mount housing 12' which is sized to receive the various components positioned below lower bushing 36 discussed in more detail below.

Post 37 passes through the middle of all the apertures/openings defined in the components above it and previously discussed. Preferably, post 37 includes hexagonal central body 60 and opposing threaded ends 59, 59', but may define any shape that provides sufficient driving planes to manually interact with and rotate the attached components. Threaded end 59 and hexagonal body 60 pass through the apertures/openings above whereby threaded end 59 engages cap 26. Threaded end 59' passes through washer 38 and engages coupling nut 27. Washer 38 has a large diameter with a small central circular opening and is not sized to fit over hexagonal body 60 and when the components are put together pressure is applied to washer 38 which pushes against post 37, maintaining lower bushing 36 within the opening (not shown) of ball mount housing 12'. On the other side of coupling nut 27, set screw 39 is inserted to further secure the entire assembly and prevent unwanted rotation or removal of coupling nut 27.

When anti-sway hitch 10 is activated by a user (not shown), rotation of trunnion 13 is translated to rotation of post 37 which is progressively resisted by the engagement of opposing engagement members 33, 34. In FIGS. 4-5C, first and second engagement members 33, 34 are presented as a rotatable riser plate and a fixed riser plate. However, these first and second engagement members 33, 34 may take a variety of forms that may be effective in the operation of anti-sway hitch 10 as long as the opposing engagement members 33, 34 are capable of vertically displacing spring 32. For example the opposing engagement members 33, 34 may be a pair of bearings that engage one another as spring bar 14 rotates trunnion 13.

FIGS. 5A-5C illustrate various side views of a rotatable riser plate during engagement with a fixed riser plate and progressively incrementally rotating when cap 26 is tightened. As cap 26 is loosened to disengage rotatable engagement member 33 from fixed engagement member 34, trunnion 14 is permitted to sway. When cap 26 is tightened on post 37, it exerts a downward pressure on lock washer 28, washer 29 and compression plate 30 which compresses spring 32 thereby applying downward pressure on the rotatable riser plate. When tightened, spring 32 forces the "locked-in" engagement of the rotatable riser plate with the fixed riser plate as seen in FIG. 5A whereby, plateaus 40 and 40' are positioned in opposing valleys 80', 80 respectively to prevent any movement or sway of trunnion 13.

The rotation of cap 26 during loosening causes post 37 to rotate likewise causing the rotatable riser plate to simultaneously rotate thereby reducing the pressure applied to spring 32 and allowing plateaus 40 to rotate such as seen in FIG. 5B approximately five degrees (5°) moving against and over plateaus 40' of fixed riser plate. As the tension is released between sloped sides 41, 42 of the rotatable riser plate against respectively sides 42', 41' of the fixed riser plate, the degree of sloped sides 43, 44 allow for the transitional slide between respectively opposing slopes 44', 43'. As trunnion 13 continues to rotate, the riser plate and post 37 correspondingly rotate.

FIG. 5C demonstrates the rotatable plate rotated approximately 10 degrees (10°), whereby sloped face 43 of side 41 overcomes sloped face 44' of side 42' and some rotation/sway is allowed, for example to prevent trailer 21 from tipping over.

In this position plateaus 40, 40' are somewhat aligned and rest against each other. As would be understood lubricants, greases, etc. are utilized between the rotatable plate, the fixed plate, and other components during placement to assist in continued mechanical operation of the various metal parts of hitch 10 as is conventional.

It is common for trailers such as trailer 21 to begin to sway while being towed, be it from the influence of wind, uneven road conditions, or shifting weight. It may be desirable for a user (not shown) to reduce or eliminate this swaying during travel. In such an instance, wrench 48 may be placed over cap 26 and rotated in a clockwise manner, compressing and engaging the components earlier described and shown in FIG. 4. Conversely, when a user wishes to increase or allow trailer 21 to sway during towing, wrench 48 can be rotated in a counterclockwise direction when engaged with cap 26 which permits trunnions 13 to rotate more freely. For example, sway may be desirable in inclimate driving conditions when rigidly preventing sway may permit a towed load such as trailer 21 to "drive" tow vehicle 11 off the road. Depending on the embodiment of cap 26 as discussed below, other adjustment procedures may be employed as needed.

Cap 26 is preferably a conventional threaded member as shown in FIGS. 1-4 for rotatably engaging threaded post 37. However, other embodiments of cap 26 are capable of incrementally imparting the necessary downward force to engage riser plate 33 and fixed plate 34 and may be used with hitch 10. For example, in one or more alternate embodiments, cap 26 may be a clamp, a cam, or a screw.

A method of towing a trailer utilizing anti-sway hitch 10 includes the steps of providing tow vehicle 11 with hitch 19 having receptacle 20 and trailer 21. The method may also include the steps of providing anti-sway hitch 10 with ball mount housings 12, 12' having channel 58 therebetween with trunnions 13 pivotally positioned therein. Hitch 10 further includes bracket 15 and shank 16 affixed to the front thereof for coupling with hitch 19 of tow vehicle 11.

The method further includes the step of providing a first engagement member 33 mounted on post 37 with spring 32, compression plate 30, washer 29, lock washer 28 and cap 26 positioned thereabove within ball mount housing 12 whereby cap 26 is adjustably affixed to post 37. The step of providing a second engagement member 34 mounted on upper bushing 35 and engaging first engagement member 33 and ball mount housing 12 with an outer wear plate 64 and an inner wear plate 65 atop trunnion 13 which is maintained in channel 58 and an inner wear plate 65' and outer wear plate 64' beneath trunnion 13 is also included in the method. The method may further include the step of providing lower bushing 36 positioned on post 37 within ball mount housing 12' and washer 38 and affixing coupling nut 27 with set screw 39 to post 37 in opposing relation to cap 26. The method may also include the step of providing spring bars 14, and couplers 18 mounted to retainers 17 for joining with spring bars 14. The method may still further include the steps of inserting shank 16 into towing receptacle 20 of towing hitch 19, attaching trailer 21 to hitch 10, fastening couplings 18 to trailer 21, inserting spring bars 14 into trunnions 13 and retainers 17 and then towing trailer 21 with tow vehicle 11.

Preferably, the towing method also includes the steps of providing first engagement member 33 with alternating plateaus 40 and valleys 80 whereby each of plateaus 40 has opposing sides 41, 42 defining respective sloped faces 43, 44 having a different bias, providing second engagement member 34 with alternating plateaus 40' and valleys 80' whereby each of plateaus 40' has opposing sides 41', 42' having respective sloped faces 43', 44' defining a different bias. The preferred method of towing trailer 21 with anti-sway hitch 10 still further includes pivoting clamps 69 to secure bar 14 on pad 49, providing wrench 48 for tightening and loosening cap 26 as needed to provide for sway of trailer 21 in conjunction with hitch 10. As would be understood upon tightening of cap 26 as earlier described first member 33 is tightly engaged with second member 34 whereby plateaus 40, 40' engage respectively valleys 80', 80 thus "locking" and preventing any sway of trailer 21 by trunnions 13. Should more sway of trailer 21 be desired cap 26 would be loosened by wrench 48 to release the pressure applied to first engagement member 33 thus allowing rotation of first member 33 to displace plateaus 40 of first member 33 from valleys 80' while simultaneously displacing plateaus 40' of second member 34 from valleys 80. Thus allowing rotatable engagement member 33 to rotate over fixed engagement member 34 allowing sway of trunnions 13 within hitch 10 and transferring such motion to allow trailer 21 to sway as desired depending on the towed load, road conditions and the like.

The illustrations and examples provided herein are for explanatory purposes and are not intended to limit the scope of the appended claims. At various points in the above description and method of operation, only one side of hitch 10 was described however it is understood that the description and method of operation applies equally to the components on the opposite side.

I claim:

1. An anti-sway trailer hitch comprising: a ball mount housing, said ball mount housing defining a channel, a trunnion, said trunnion pivotally positioned within said channel, a spring, a first engagement member, said first engagement member defining a plateau with a pair of sides attached in opposing relation to said plateau, each of said opposing sides defining a sloped face, said spring mounted on said first engagement member within said ball mount housing, a second engagement member, said first engagement member engaging said second engagement member, a post, a cap, said post positioned within said ball mount housing, said cap adjustably attached to said post, said engagement members positioned on said post wherein rotation of said trunnion causes corresponding rotation of said post and said first engagement member.

2. The hitch of claim 1 wherein each of said sloped faces has a different bias.

3. The hitch of claim 1 wherein said second engagement member defines a plateau with a pair of sides attached in opposing relation to said second engagement member plateau, each of said opposing sides defining a sloped face.

4. The hitch of claim 3 wherein each of said sloped faces has different bias.

5. The hitch of claim 1 further comprising a spring bar, said spring bar mounted to said trunnion.

6. The hitch of claim 5 further comprising a retainer having a hanger plate and a clamp, said clamp pivotally affixed to said hanger plate, said spring bar mounted to said clamp.

7. An anti-sway trailer hitch assembly in combination with a tow vehicle, said hitch assembly comprising: a ball mount housing, said ball mount housing defining a channel, a bracket, said bracket affixed to said ball mount housing, a shank, said bracket mounted to said shank, a trunnion, said trunnion pivotally positioned within said channel, a spring, a first engagement member, said first engagement member defining a plateau with a pair of sides attached in opposing relation to said plateau, each of said opposing sides defining a sloped face, said spring mounted on said first engagement member within said ball mount housing, a second engagement member, said first engagement member engaging said second engagement member, a post, a cap, said post positioned within said ball mount housing, said cap adjustably attached to said post, said engagement members mounted on said post, a spring bar, said spring bar attached to said trunnion, a coupling, a retainer, said retainer affixed to said coupling, said spring bar mounted to said retainer; and a tow vehicle, a tow hitch, said tow hitch affixed to said tow vehicle, said hitch defining a towing receptacle, said towing receptacle sized to receive said shank.

8. The combination of claim 7 wherein each of said sloped faces has a different bias.

9. The combination of claim 8 wherein said second engagement member defines a plateau.

10. The combination of claim 9 wherein said second engagement member plateau comprises a pair of opposing sides, each of said opposing sides attached to said second engagement member plateau and define a sloped face.

11. The combination of claim 10 wherein each of said sloped faces has a different bias.

12. The combination of claim 11 further comprising a trailer, said coupling affixed to said trailer.

13. The combination of claim 12 wherein said retainer further comprises a hanger plate, a clamp, said clamp pivotally affixed to said hanger plate, a pad, said pad attached to said hanger plate.

14. The combination of claim 13 wherein said clamp comprises a finger, said finger attached to said clamp, a cylinder, said cylinder mounted to said clamp.

15. The combination of claim 14 wherein said hanger plate defines a channel, a hitch pin, said hitch pin positioned within said channel, said hitch pin defining an aperture, a cotter pin, said cotter pin positioned within said hitch pin aperture.

16. A method of towing a trailer comprising the steps of:
   a) providing a tow vehicle having a towing receptacle, a hitch with an adjustable cap, a first engagement member with a plateau, the plateau defining a pair of sides in opposing relation on the plateau, each of the opposing sides defining a sloped face, each of the sloped faces having a different bias, a second engagement member engaging the first engagement member, a post positioned on the hitch with the engagement members mounted thereon, the cap attached to the post;
   b) connecting the hitch to the towing receptacle;
   c) fastening the trailer to the hitch; and
   d) towing the trailer with the tow vehicle.

17. The method of claim 16 further comprising the steps of:
   a) rotatably fastening the cap on the post; and
   b) pressing the first engagement member against the second engagement member.

18. The method of claim 16 wherein the step of providing a second engagement member further comprises the step of providing a second engagement member with a plateau, the second engagement member plateau defining a pair of sides in opposing relation, each of the opposing sides defining a sloped face, and each of the sloped faces having a different bias.

* * * * *

UNITED STATES PATENT AND TRADEMARK OFFICE
CERTIFICATE OF CORRECTION

| | | |
|---|---|---|
| PATENT NO. | : 8,641,075 B1 | Page 1 of 1 |
| APPLICATION NO. | : 13/714798 | |
| DATED | : February 4, 2014 | |
| INVENTOR(S) | : Bruce A. Angel | |

It is certified that error appears in the above-identified patent and that said Letters Patent is hereby corrected as shown below:

On the Title Page Item (73) reads as "Comco Manufacturing, Inc.". The Assignee should correctly read "Camco Manufacturing, Inc.".

Signed and Sealed this
Twenty-fourth Day of March, 2015

Michelle K. Lee
*Director of the United States Patent and Trademark Office*